(12) United States Patent
Tan et al.

(10) Patent No.: US 10,913,154 B2
(45) Date of Patent: Feb. 9, 2021

(54) SYSTEMS AND METHOD FOR ROBOTIC LEARNING OF INDUSTRIAL TASKS BASED ON HUMAN DEMONSTRATION

(71) Applicant: General Electric Company, Schenectady, NY (US)

(72) Inventors: Huan Tan, Clifton Park, NY (US); John Robert Hoare, Latham, NY (US); Justin Michael Foehner, Penfield, NY (US); Steven Robert Gray, Niskayuna, NY (US); Shiraj Sen, Clifton Park, NY (US); Romano Patrick, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 323 days.

(21) Appl. No.: 15/860,377

(22) Filed: Jan. 2, 2018

(65) Prior Publication Data
US 2019/0202053 A1 Jul. 4, 2019

(51) Int. Cl.
*B25J 9/00* (2006.01)
*B25J 9/16* (2006.01)
*G05D 1/00* (2006.01)

(52) U.S. Cl.
CPC ............ *B25J 9/1664* (2013.01); *B25J 9/161* (2013.01); *B25J 9/1671* (2013.01);
(Continued)

(58) Field of Classification Search
CPC ........ B25J 9/1664; B25J 9/161; B25J 9/1671; G05D 1/0044; G05B 2219/40515;
(Continued)

(56) References Cited

U.S. PATENT DOCUMENTS 6,445,964 B1  9/2002  White et al.
8,843,236 B2  9/2014  Barajas et al.
(Continued)

OTHER PUBLICATIONS

Natonek, E., et al.; "Model based vision as feedback for virtual reality robotics environments", Virtual Reality Annual International Symposium, 1995. Proceedings, p. 110-117, 1995, North Carolina.
(Continued)

*Primary Examiner* — Ian Jen
(74) *Attorney, Agent, or Firm* — Fletcher Yoder, P.C.

(57) ABSTRACT

A system for performing industrial tasks includes a robot and a computing device. The robot includes one or more sensors that collect data corresponding to the robot and an environment surrounding the robot. The computing device includes a user interface, a processor, and a memory. The memory includes instructions that, when executed by the processor, cause the processor to receive the collected data from the robot, generate a virtual recreation of the robot and the environment surrounding the robot, receive inputs from a human operator controlling the robot to demonstrate an industrial task. The system is configured to learn how to perform the industrial task based on the human operator's demonstration of the task, and perform, via the robot, the industrial task autonomously or semi-autonomously.

20 Claims, 6 Drawing Sheets

(52) U.S. Cl.
CPC . *G05D 1/0044* (2013.01); *G05B 2219/40099* (2013.01); *G05B 2219/40131* (2013.01); *G05B 2219/40323* (2013.01); *G05B 2219/40515* (2013.01); *Y10S 901/03* (2013.01)

(58) Field of Classification Search
CPC ........... G05B 2219/40131; G05B 2219/40323; G05B 2219/40099; Y10S 901/03
See application file for complete search history.

(56) References Cited

U.S. PATENT DOCUMENTS

| | | | |
|---|---|---|---|
| 8,996,177 | B2 | 3/2015 | Coenen |
| 9,579,799 | B2 | 2/2017 | Parker |
| 9,586,315 | B2 | 3/2017 | Guerin et al. |
| 9,609,288 | B1 | 3/2017 | Richman et al. |
| 9,630,318 | B2 | 4/2017 | Ibarz Gabardos et al. |
| 9,671,777 | B1 | 6/2017 | Aichele et al. |
| 2014/0257525 | A1* | 9/2014 | Nagamatsu ......... H04L 12/2816 700/28 |
| 2016/0257000 | A1 | 9/2016 | Guerin et al. |
| 2017/0205814 | A1* | 7/2017 | Marsolek ............. G07C 5/0841 |
| 2017/0205999 | A1* | 7/2017 | Marsolek ............. G07C 5/0808 |
| 2017/0329307 | A1 | 11/2017 | Castillo-Effen et al. |

OTHER PUBLICATIONS

Hertkorn, Katharina, et al.; "Virtual reality support for teleoperation using online grasp planning", Intelligent Robots and Systems (IROS), 2013 IEEE/RSJ International Conference on, p. 2074-2074, 2013, Tokyo.
International Search Report/Written Opinion; PCT/US2018/062514 dated Mar. 15, 2019; pp. 1-12.
EPO Communication pursuant to Rules 161(1) and 162 EPC, EP Application No. 18816440.4-1205, dated Aug. 11, 2020; pp. 1-3.

* cited by examiner

SYSTEMS AND METHOD FOR ROBOTIC LEARNING OF INDUSTRIAL TASKS BASED ON HUMAN DEMONSTRATION

BACKGROUND

The subject matter disclosed herein relates to industrial tasks performed by a robot, and more specifically to robots learning how to perform industrial tasks.

Various entities' operations may include performance of industrial tasks, such as asset inspection, asset repair, asset manipulation, asset maintenance, environmental monitoring, etc. Such assets may include physical or mechanical devices, structures, or facilities which may, in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid as well as individual or discrete assets, such as an airplane, a wind turbine generator, a radio tower, a steam or smoke stack or chimney, a bridge or other structure, a vehicle, and so forth. During operations, the assets may be manipulated (e.g., valve actuated, one or more actuators actuated, one or more components moved, etc.). Further, the assets may be subject to various types of defects (e.g., spontaneous mechanical defects, electrical defects, as well as routine wear-and-tear) that may impact their operation. For example, over time, the asset may undergo corrosion or cracking due to weather or may exhibit deteriorating performance or efficiency due to the wear or failure of component parts.

Typically, one or more human operators may perform the industrial task. For example, the operator may actuate a component of the asset, may locate corrosion on the asset, may locate and quantitatively or qualitatively assess cracks or defects on the asset, may assess an asset for the degree of wear-and-tear observed versus what is expected, may repair an asset, and so forth. However, depending on the location, size, and/or complexity of the asset, having one or more human operators performing industrial tasks may take away time for the operators to perform other tasks or may otherwise be time consuming and labor intensive, requiring personnel time that might be more productively spent elsewhere. Additionally, some industrial tasks may be dull, dirty, dangerous, or may be otherwise unsuitable for a human to perform. For instance, some assets may have locations that may not be accessible to humans due to height, confined spaces, or the like.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, a system for performing industrial tasks includes a robot and a computing device. The robot includes one or more sensors that collect data corresponding to the robot and an environment surrounding the robot. The computing device includes a user interface, a processor, and a memory. The memory includes instructions that, when executed by the processor, cause the processor to receive the collected data from the robot, generate a virtual recreation of the robot and the environment surrounding the robot, receive inputs from a human operator controlling the robot to demonstrate an industrial task. The system is configured to learn how to perform the industrial task based on the human operator's demonstration of the task, and perform, via the robot, the industrial task autonomously or semi-autonomously.

In another embodiment, a processor-implemented learning system, including a processor and a memory. The memory includes instructions that, when executed by the processor, cause the processor to receive inputs from a human operator controlling a robot as a demonstration of an industrial task, learn how to control the robot to perform the industrial task based on the demonstration of the industrial task by the human operator, and control the robot to perform the industrial task autonomously or semi-autonomously.

In a further embodiment, a method of performing an industrial task includes receiving inputs from a human operator demonstrating performance of an industrial task, learning how to perform the industrial task based on the demonstration of the industrial task, generating a motion plan for performing the industrial task, displaying the motion plan to the human operator for approval, and performing, via a robot, the industrial task upon approval of the motion plan.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
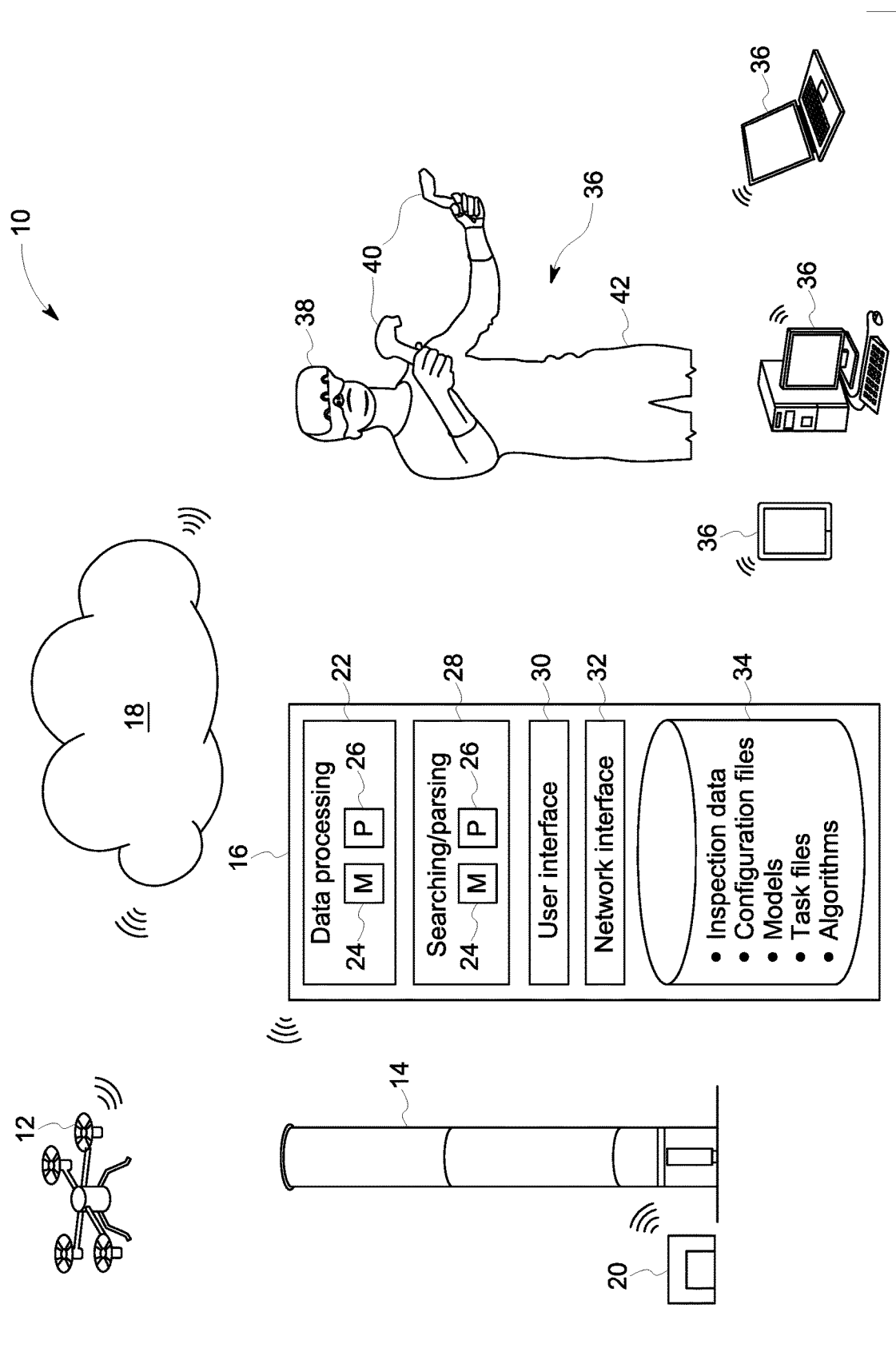
FIG. 1 illustrates a system for performing industrial tasks, in accordance with an embodiment.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, the present approach relates to performance of industrial tasks using robots, unmanned vehicles, or drones and/or inspections implemented by automated or computer-based routines that learn how to perform a task based on human demonstration of the task. By way of example, such industrial tasks may be performed using unmanned or robotic devices, such as ground-based mobile robots, including those with legs, wheels, tracks, etc., unmanned aerial vehicles (UAVs), including fixed wing and rotary wing vehicles, unmanned submersible vehicles (USVs), which may swim or move along the floor of the body of liquid, or other autonomously moving vehicles that may be characterized as drones or robots. As used herein, the terms "drone" and "robot" are intended to encompass all variations, of UAVs, USVs, robotic devices, and so forth that are capable of programmable movement with limited human oversight. Such programmable movement can be based on either locally generated path waypoints or guidance or path guidance and waypoints generated by a remote system and communicated to the robot. Thus, as used herein, such devices move during an operational phase or period with limited human intervention or oversight. In accordance with present approaches, such devices may be operated to move along a flight plan, along which the devices acquire data, such as video or still image data, LIDAR data, acoustic data, spectroscopic data, temperature or pressure data, chemical samples, smells, or other data that can be acquired by sensors or cameras that can be affixed to a device moving along the flight plan. In general, such industrial tasks may be performed on one or more assets including, but not limited to, power generation assets, communication assets, transportation assets, mining or underground pumping assets, manufacture or construction assets and so forth.

Though the phrase "flight plan" is used generally herein, it should be appreciated that this phrase does not necessitate aerial movement, but instead relates to any one-dimensional (1D) (such as along a track), two-dimensional (2D) (such as along a defined or undefined planar route), or three-dimensional (3D) (such as movement in the air, under water, or on a structure in where depth or altitude is also traversable), or four-dimensional (4D) (such as where there are defined temporal aspects that may characterize a velocity, acceleration, or a time on station at a waypoint) path or route along which a drone moves as part of an flight plan. Thus, a "flight plan" as used herein may be characterized as any 1D, 2D, 3D, or 4D route or path along which device such as a drone or robot is moved to perform an industrial task, including inspection tasks. Such a path may be adaptive and/or may consist of one or more waypoints along which the robot proceeds in an ordered fashion, with the sequence and location of the waypoints defining the path or route. It should be appreciated that such a flight plan may also incorporate not only temporal and/or spatial locations, but also orientation and/or alignment instructions for movement along the path and/or to exhibit at a given waypoint. Thus, the flight plan may also specify parameters such as roll, pitch, and yaw for the drone to exhibit at different points along the flight plan as well as two- or three-dimensional alignment characteristics that may relate to the direction in which a sensor or camera is pointing at a point along the flight plan. Thus, the flight plan may address not only where or when a robot is with respect to an industrial task site but, at a given location or waypoint, the direction the robot is facing or otherwise oriented with respect to. Further, even at the same waypoint and orientation, images may be acquired at different magnifications, wavelengths, or other optical parameter such that effectively the image constitutes a different view. As discussed herein, the present approach facilitates the performance of an industrial task by acquired sensor data gathered during performance of the task.

In addition, in accordance with certain aspects, prior knowledge may be leveraged during the industrial task. For example, prior knowledge may be used in generating or modifying an adaptive task plan or flight plan. In certain aspects, machine learning approaches may be employed to learn from human demonstration and/or human reviewer decisions (e.g., regarding asset condition, data sufficiency, decision oversight, mission planning, etc.), thereby creating a trained artificial neural network based on this prior knowledge that can facilitate future data sufficiency decisions.

To facilitate explanation and provide useful real-world context, various examples such as wind turbine generators, radio transmission towers, smokestacks, and so forth are provided herein. It should be appreciated however that such examples are provided merely to facilitate explanation, and the present approach is suitable for use with a wide range of other assets and at various other types of sites. Thus, the present approach is not intended to be limited to the context of the present examples.

With the preceding in mind, and turning to the figures, FIG. 1 depicts aspects of a system 10 for performing industrial tasks. As shown, the system 10 employs one or more robots 12 suitable for performing an industrial task on or near one or more assets 14, such as a smokestack, or other suitable asset.

The system 10 also includes a remote server 16, accessible via a cloud 18 (e.g., a network interface for accessing one or more remote servers, virtual machines, etc. for storage, computing, or other functionality), which may communicate with the one or more robots 12 to coordinate operation of one or more robots 12, such as for performance of the task. In one implementation, the robot(s) 12 have onboard cellular or network connectivity and can communicate with the remote server 16 at least prior to and/or during performance of the task. In certain implementations the cellular or network connectivity of the robot(s) 12 allow communication during a task, allowing inspection data to be communicated to the remote server 16 and/or allowing the remote server 16 to communicate with a given robot 12.

As shown, in some embodiments, the system 10 may also include a docking station 20 (e.g., robot garage), disposed on or near the asset 14, for short term or long term storage of the robot 12 before and/or after performance of the task. In some embodiments, the docking station 20 may be in communication with the remote server 16 via the cloud 18. If the robot 12 relies on a battery for power, the docking station 20 may also include a power source for charging the robot's 12 battery.

In the depicted example, the remote server 16 is a remote computing device accessible by the robot(s) 12 via the cloud 18. Though only a single remote server 16 is shown in FIG.

1, it should be understood that the functions performed by the remote server 16 may be performed by multiple remote servers 16 and/or by virtualized instances of a server environment. In the instant embodiment, the remote server 16 includes a data processing system 22, which may include a memory component 24 and a processor 26, for processing data received from the robot 12. As is described in more detail below, in some embodiments, the robot 12 may provide raw data to the remote server 16 for processing. In other embodiments, the robot 12 may pre-process or partially process the data before passing it to the remote server 16. In further embodiments, all of the data processing may be performed by the robot 12.

The remote server 16 also includes a searching/parsing component 28, which may also include a memory 24 and a processor 26, for searching, parsing, and otherwise interacting with data stored on the remote server 16. A user interface 30 may receive inputs from a user. For example, the data processing system 22 may utilize machine learning (e.g., a trained artificial neural network) that uses inputs from a user provided via the user interface 30 or from another computing device. The user inputs may be demonstrative (e.g., demonstrate how to perform a task), supervisory (e.g., the user monitors the robot and provides guidance as the robot performs the inspection), corrective (e.g., the user corrects the robot when the robot does something incorrectly), reinforcing (e.g., the user tells the robot when the robot does something correctly), decisive (e.g., the user makes a decision for the robot when prompted), instructive (e.g., identifying features in the asset), etc. In some embodiments, the user may interrupt the robot's performance of a task with feedback. In other embodiments, the robot may prompt the human operator by requesting feedback. A network interface 32 facilitates communication between the robot(s) 12 via the cloud 18. As shown, the remote server 16 may store and maintain one or more databases 34. These databases 34 may include instructions for performing various tasks, inspection data, configuration files, models of assets and/or areas surrounding assets, task files, algorithms, etc.

During or following performance of an industrial task, the robot 12 may send collected data to the remote server 16 for processing, analysis, and/or storage. By way of example, videos, images, LIDAR data, depth sensor data, acoustic data, spectroscopic data, or other relevant sensor or camera data acquired by the one or more robots 12 during a task may be uploaded to the database 34 as acquired or as a batch after an inspection flight plan is completed. Alternatively, in other implementations, the collected data may be provided to the database 34 by other means or channels, such as via direct transmission from the robot 12 and/or via other intermediary communication structures, such as a dedicated inspection data communication circuit.

In the depicted example, the data processing system 22, the database 34, and the searching/parsing component 28 are depicted as part of a single or common processor-based system. However, the depicted functionalities may be implemented in a distributed or dispersed manner, with certain aspects being local to the asset 14, to the robot 12, to an operational facility and/or other locations remote from the asset 14. In such distributed implementations, the depicted aspects may still be communicatively linked, such as over one or more network connections.

As shown, the system 10 also includes one or more workstations 36. In the illustrated embodiment, the workstations 36 are separate from the remote server 16. However, in some embodiments, the operations of the remote server 16 and the workstations 36 may be performed by a single computing device. The workstations may include, for example, a smart phone, a tablet computer, a laptop computer, a desktop computer, a virtual reality system (including a virtual reality headset 38 and one or more controllers 40), etc. As described in more detail below, one or more sensors (e.g., cameras, infrared sensors, proximity sensors, etc.) disposed on or around the one or more robots 12 may be used to generate a virtual recreation of the one or more robots and the environment around the one or more robots. In some embodiments, models of the asset, various components of or around the asset, and/or the surrounding area may be used in the virtual recreation. The virtual environment may then be displayed to an operator 42 via the workstation 36 (e.g., via the virtual reality headset, a display of the work station 36, a television, a projection, etc.). The operator may then use one or more input devices (e.g., the controllers 40, a mouse, a joystick, a remote control, a keyboard, etc.) to control the robot and demonstrate how the task is performed. The task may include, for example, inspecting an asset, actuating a component of an asset (e.g., actuating a valve), collecting samples of a gas, liquid, or solid, performing chemical tests, repairing an asset or a component of an asset, assembling industrial parts, polishing and blending parts, pulling or pushing controllers, cutting pipes, welding parts, etc. In some embodiments, the user's control of the one or more robots 12 via the input devices may result in movement of the one or more robots 12 on or around the asset 14. In other embodiments, the user's 42 movement only controls virtual instantiations of the one or more robots 12 within the virtual environment (i.e., the actual robots 12 do not move in response to the user's control inputs). In some embodiments, the user may perform the industrial task more than once in order to cover various embodiments, permutations, or techniques for performing the task. Based on the user's 42 demonstration of the task, the system 10 learns how to perform the task such that one or more robots 12 may perform the task with minimal input and/or supervision from the human operator 42. In some embodiments, the learning may be done by the server 16, or a component of the server 16, that subsequently controls the one or more robots to perform the industrial task. In other embodiments, the learning is done by the robots themselves based on the human operator's demonstration. The robots may then proceed to perform the industrial task. In other embodiments, the learning functions may be distributed between multiple servers 16, or the robot 12 and one or more servers 16. In some embodiments, however, a human operator 42 may utilize the workstation 36 to monitor and/or supervise the robots 12, and to provide feedback and/or inputs to the robots when requested. For example, once the robots 12 have learned how to perform the tasks, the system 10 may generate a virtual recreation of the environment surrounding the robot 12, or a video of the robot 12, as the robot 12 performs the task. The human operator 42 may monitor the performance of the task via the workstation 36 and provide feedback (e.g., when prompted or otherwise) during the performance of the task.

Figure 2:
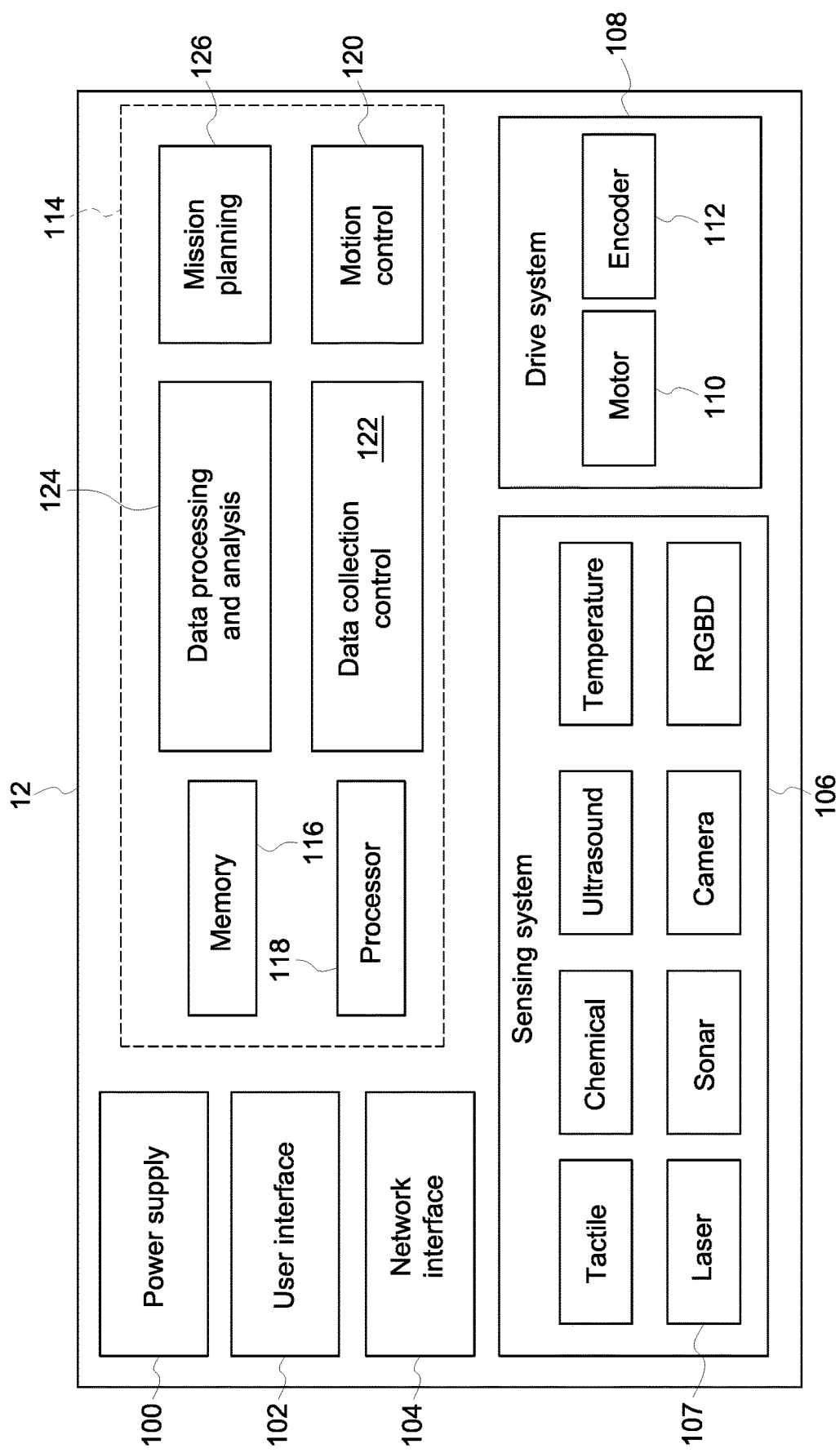
FIG. 2 is a schematic of a robot of the system for performing industrial tasks of FIG. 1, in accordance with an embodiment.

FIG. 2 is a schematic of an embodiment of the robot 12 shown in FIG. 1. It should be understood, however, that other embodiments of the robot 12 are envisaged having additional components, fewer components, and/or different combinations of components. As shown, the robot 12 includes a power supply 100 to provide power for the operation of the robot 12. The power supply 100 may include a replaceable or rechargeable battery, a combustion engine, a generator, and electric motor, a solar panel, a chemical-reaction based power generation system, etc., or some combination thereof.

The robot may include a user interface 102, by which a user may set up or adjust various settings of the robot 12. The user interface may include one or more input devices (e.g., knobs, buttons, switches, dials, etc.) and in some cases may include a display (e.g., a screen, array of LEDs, etc.) for providing feedback to the user. Though previously discussed embodiments receive user feedback via the user interface of the remote server, embodiments in which user feedback is provided via the user interface 102 of the robot 12 are also envisaged.

A network interface 104 enables communication with the remote server via the cloud, or other devices (e.g., the docking station, a remote controller, a smart phone, a computing device, a tablet, etc.). For example, the network interface 104 may enable communication via a wireless network connection, a wired network connection, cellular data service, Bluetooth, Near Field Communication (NFC), ZigBee, ANT+, or some other communication protocol. In some embodiments, data sent or received via the network interface may be encrypted. For example, standard data encryption techniques may be utilized, such as hashing, key exchange encryption, symmetric encryption methods, asymmetric encryption methods, or a combination thereof. In some embodiments, the network interface 104 may allow the robot 12 to connect to a remote controller, a computing device, a smart phone, a tablet computer, etc.

A sensing system 106 may include one or more sensors 107 (e.g., tactile, chemical, ultrasound, temperature, laser, sonar, camera, a red, blue, green, depth (RGB-D) camera, etc.) configured to sense various qualities and collect data corresponding to the asset during performance of an industrial task. As previously discussed, some of the one or more sensors 107 may be used to generate a virtual recreation of the environment surrounding the robot.

A drive system 108 may actuate movement of the robot 12 through the air, through a liquid, along a surface, or some combination thereof. As shown, the drive system 108 may include one or more motors 110 and one or more encoders 112. The one or more motors 110 may drive propellers, legs, wheels, tracks, etc. The one or more encoders 112 may sense one or more parameters of the one or more motors 110 (e.g., rotational speed) and provide data to a control system 114.

The control system 114 may include one or more memory components 116 and one or more processors 118. A motion control system 120 may receive a signal from the one or more encoders 112 of the drive system 108, and/or commands from the human operator via the network interface 104, and output a control signal to the one or more motors 110 to control the movement of the robot 12. Similarly, a data collection control system 122 may control the operation of the sensing system 106 and receive data from the sensing system 106. A data processing and analysis system 124 may receive data collected by the sensing system 106 and process or analyze the collected data. In some embodiments, the data processing and analysis system 124 may completely process and analyze the data and make a determination as to the condition of the asset. In other embodiments, the data processing and analysis system 124 may perform pre-processing of the data or a partial processing and analysis of the data and then send the data to the remote server for the remainder of processing and analysis. In further embodiments, the robot 12 may send raw data to the remote server. When user feedback is provided, the data processing and analysis system 124 may take the user inputs into account when processing and/or analyzing the inspection data. In some embodiments, user feedback may be communicated back to the robot 12.

In one implementation, the control system 114 may also include a mission planning component 126. The mission planning component 126 generates a mission plan and executes the mission plan by coordinating the various other components of the control system 114 and the robot 12. The mission planning component 126 may utilize, for example, control inputs of the human operator controlling the robot 12 in real time or near real time, data describing how industrial tasks are to be performed (e.g., based on demonstration by the human operator), models of the asset, components of the asset, components in the vicinity of the robot, and/or models of the surrounding area. The mission planning component 126 may then learn from the human operator's demonstration of the task, and generate a plan for the robot 12 to perform the industrial task autonomously or semi-autonomously. As described in more detail below with regard to FIG. 4, in some embodiments, the robot may include a manipulator that enables the robot to interact with other components. For example, the manipulator may be an arm or some other structure that the robot utilizes to interact with objects in its surrounding environment to perform the industrial task.

Figure 3:
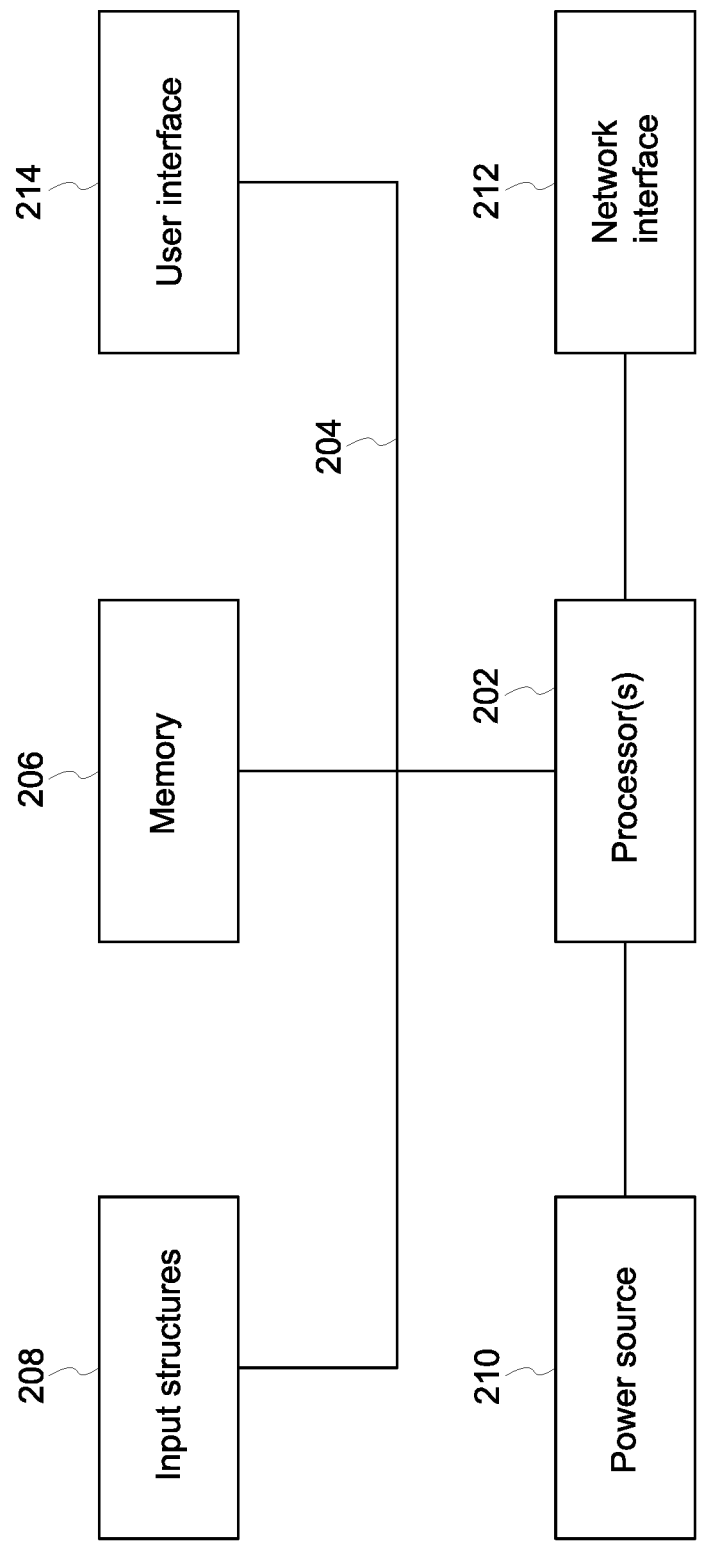
FIG. 3 is a block diagram of a remote server and/or a workstation of the asset inspection system of FIG. 1, in accordance with an embodiment.

FIG. 3 generally illustrates a block diagram of example components of a computing device 200 that could be used as the remote server and/or the workstation. As used herein, a computing device 200 may be implemented as one or more computing systems including laptop, notebook, desktop, tablet, or workstation computers, as well as server type devices or portable, communication type devices, such a cellular telephones, and/or other suitable computing devices.

As illustrated, the computing device 200 may include various hardware components, such as one or more processors 202, one or more busses 204, memory 206, input structures 208, a power source 210, a network interface 212, a user interface 214, and/or other computer components useful in performing the functions described herein.

The one or more processors 202 are, in certain implementations, microprocessors configured to execute instructions stored in the memory 206 or other accessible locations. Alternatively, the one or more processors 202 may be implemented as application-specific integrated circuits (ASICs), field-programmable gate arrays (FPGAs), and/or other devices designed to perform functions discussed herein in a dedicated manner. As will be appreciated, multiple processors 202 or processing components may be used to perform functions discussed herein in a distributed or parallel manner.

The memory 206 may encompass any tangible, non-transitory medium for storing data or executable routines, including volatile memory, non-volatile memory, or any combination thereof. Although shown for convenience as a single block in FIG. 3, the memory 206 may actually encompass various discrete media in the same or different physical locations. The one or more processors 202 may access data in the memory 206 via one or more busses 204.

The input structures 208 are used to allow a user to input data and/or commands to the device 200 and may include mice, touchpads, touchscreens, keyboards, controllers, and so forth. The power source 210 can be any suitable source for providing power to the various components of the computing device 200, including line and battery power. In the depicted example, the device 200 includes a network interface 212. Such a network interface 212 may allow communication with other devices on a network using one or more communication protocols. In the depicted example, the device 200 includes a user interface 214, such as a display configured to display images or date provided by the one or more processors 202. The user interface 214 may include, for example, a monitor, a display, a virtual reality headset, a television, a projector, or some combination thereof. As will be appreciated, in a real-world context a processor-based systems, such as the computing device 200 of FIG. 3, may be employed to implement some or all of the present approach, such as performing the functions of the remote server and/or the workstations shown in FIG. 1.

Figure 4:
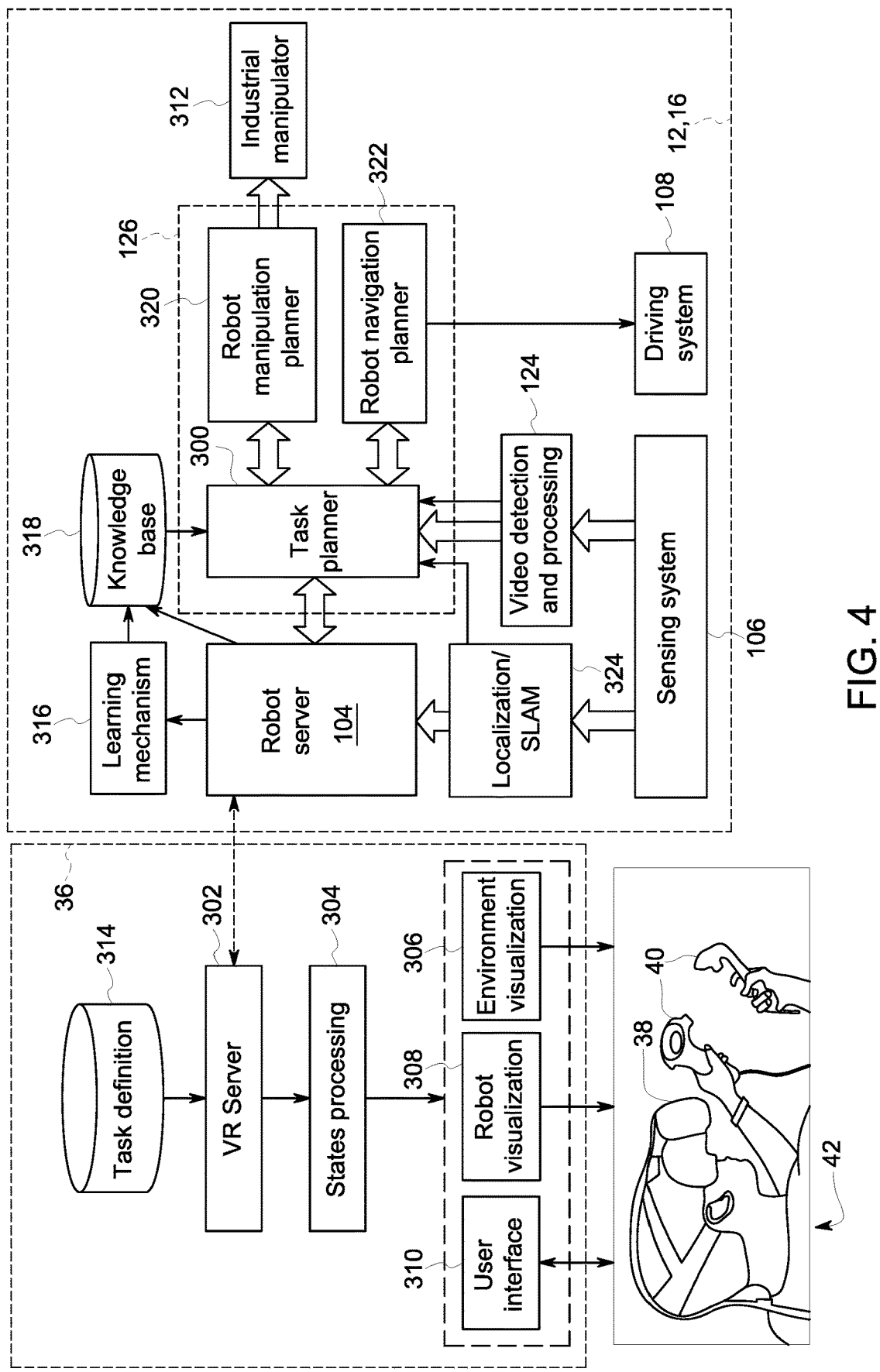
FIG. 4 is a schematic illustrating interactions between the robot, the remote server, and the workstation of the asset inspection system of FIG. 1 in performing the industrial task, in accordance with an embodiment.

FIG. 4 is a schematic illustrating interactions between the robot 12, the remote server 16, and the workstation 36 in performing an industrial task. The robot 12, the remote server 16, and the workstation 36 may communicate with one another via respective network interfaces (e.g., communication servers). In the illustrated embodiment, some functions are shared between the robot 12 and the server 16. It should be understood that these functions may be performed entirely by the robot, or may be shared between the robot 12 and the server 16. As previously described, the sensing system 106 includes one or more sensors that collect information about the environment surrounding the robot 12. The collected data is provided to the video detection and processing system 124, where the collected data is processed, and then passed to a task planning component 300 of the mission planning system 126. The task planner 300 transmits the data to the work station 36 via the network interface 104 (e.g., robot server) of the robot 12 and the remote server 36. The data is received by a network interface 302 of the workstation 36 (e.g., via the remote server 16, the cloud 18, or both), and then passed to a states processing component 304. The states processing component 304 uses the received data to generate a visualization 306 of the environment surrounding the robot 12, and a visualization 308 of the robot 12 itself within the environment. The visualizations are then presented to the human operator 42 via a user interface 310 (e.g., the virtual reality headset 38). Using one or more controllers 40 of the user interface 310, the user 42 controls the robot visualization 308 within the environmental visualization 306 to perform the task. The inputs by the human operator 42 may then be sent back to the robot 12 (via the respective network interfaces 302, 104). The robot 12 may then generate one or more control signals based on the inputs of the human operator 42 to control one or more components (e.g., the drive system 108, an industrial manipulator 312, an actuator, etc.) of the robot 12. As shown, the workstation 36 may include a task definitions database 314 for various tasks performed, such that the human operator can associate various actions demonstrated via the virtual reality system 36 with one or more industrial tasks.

As the human operator 42 demonstrates the task, a learning mechanism breaks down the demonstrated activity into component parts (e.g., actions), generalizes the actions, and learns how to perform the actions autonomously or semi-autonomously. Data for how to recreate the demonstrated task (e.g., configuration of the robot, environmental state, goals, executed motions, sequence of motions, goals, etc.) may be stored in a knowledge base 318 for retrieval later.

When the robot 12 is instructed to perform the demonstrated task, the task planner 300 of the mission planning system 126 retrieves the data associated with the task from the knowledge base 318 and plans to perform the task autonomously or semi-autonomously. As shown, the mission planning system 126 may also include a robot manipulation planner 320, which may plan and control an industrial manipulator 312 (e.g., arms, actuators, etc.) that may manipulate an asset or a component of an asset, as well as a robot navigation planner 322, which plans the flight plan for the robot 12. In some embodiments, the robot navigation planner 322 may rely on input from a localization or simultaneous localization and mapping (SLAM) component 324 to identify the robot's 12 position. The robot 12 may then proceed to perform the planned task autonomously or semi-autonomously. As the task is being performed, the sensing system 106 may collect video, which is passed through the video detection and processing component 124 and the network interface 104 to the workstation 36. As previously described, the data is used to create a visualization 306 of the surrounding environment and a visualization 308 of the robot 12 within the environment for display to the human operator (e.g., via the user interface 310). The human operator 42 may then supervise the robot 12 as it performs the task. At times, the robot 12 may request input from the human operator 42 as the robot 12 performs the task. Other times, the human operator 42 may provide feedback unprompted.

Figure 5:
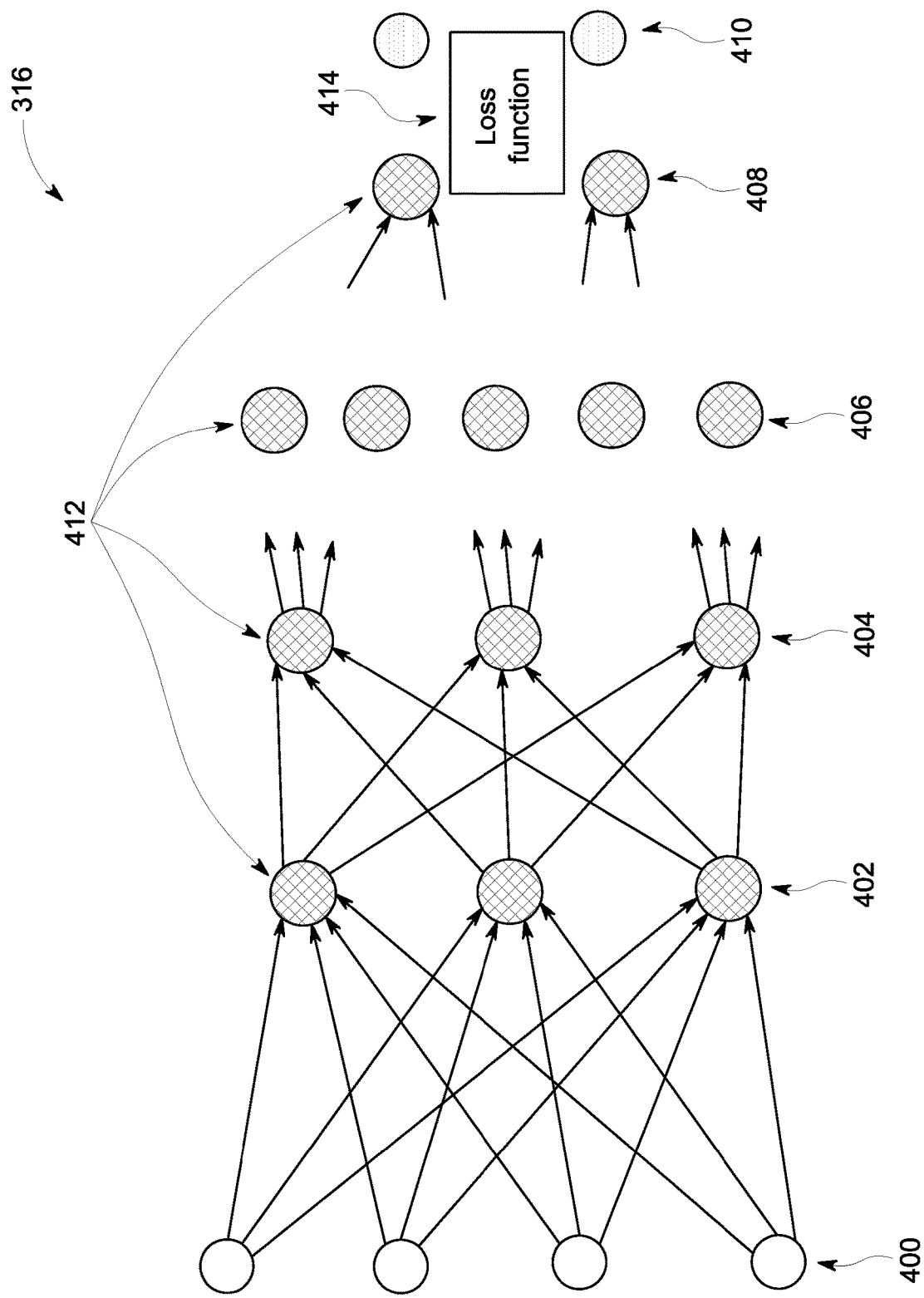
FIG. 5 is a schematic illustrating an example of a learning mechanism as shown in FIG. 4, in accordance with an embodiment.

FIG. 5 schematically depicts an example of the learning mechanism 316 (e.g., artificial neural network) that may be trained as a deep learning model as discussed herein. In this example, the network 306 is multi-layered, with a training input 400 (e.g., task demonstration and/or user feedback) and multiple layers including an input layer 402, hidden layers 404, 406, and so forth, and an output layer 408 and the training target 410 present in the network 306. Each layer, in this example, is composed of a plurality of "neurons" or nodes 412. The number of neurons 412 may be constant between layers or, as depicted, may vary from layer to layer. Neurons 412 at each layer generate respective outputs that serve as inputs to the neurons 412 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 408 which, in conjunction with a target value or construct 410, are used to compute some loss or error function 414, which will be backpropagated to guide the network training.

The loss or error function 414 measures the difference between the network output 408 and the training target 410. In certain implementations, the loss function may be a mean squared error (MSE). Alternatively, the loss function 414 could be defined by other metrics associated with the particular task in question, such as a softmax function.

With the preceding in mind, the neural network 306 may be trained for use in learning how to perform and planning industrial tasks.

Figure 6:
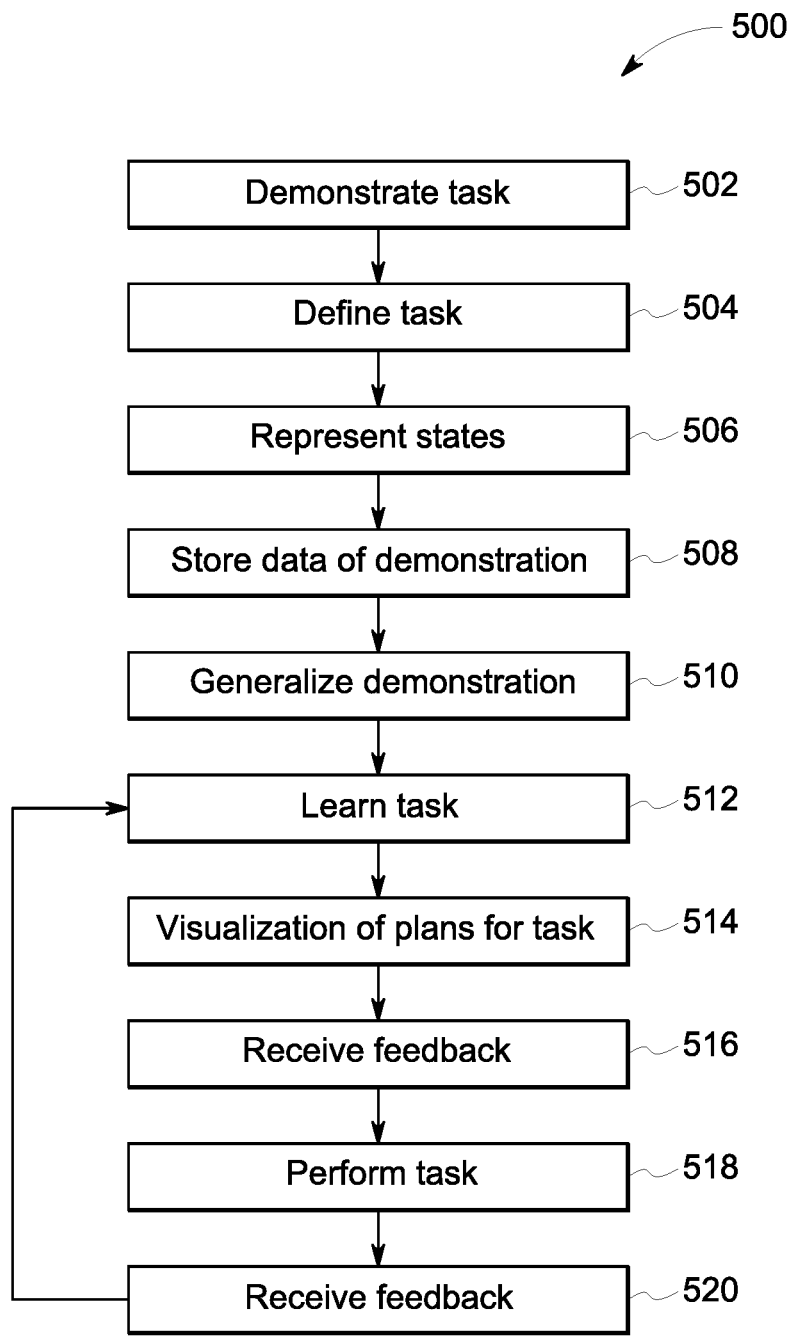
FIG. 6 is a flow chart of a process for performing an industrial task based on a human demonstration of the task, in accordance with an embodiment.

FIG. 6 is a flow chart of a process 500 for performing an industrial task based on a human demonstration of the task. In block 502, the human operator demonstrates performance of the task. As previously described, data from one or more sensors disposed on or near the robot may be used to create a virtual recreation of the robot and its surrounding environment. The data may include, for example, video or still image data, LIDAR data, acoustic data, spectroscopic data, temperature or pressure data, chemical samples, smells, or other data that can be acquired by sensors or cameras that can be affixed to a device moving along the flight plan. The virtual environment may be displayed to the human operator via a workstation (e.g., virtual reality headset, computer monitor, television, projector, etc.). The human operator may then control the virtual robot within the virtual environment (including motion and analytics) via one or more controllers to demonstrate performance of the task. In some embodiments, the human operator's inputs are used to control the actual robot performing the task at a remote location. In some embodiments, the human operator may set sub-goals for the robot to accomplish. The robot may plan motion to accomplish the sub-goals, which may be selected and/or validated by the human operator. After selection and/or confirmation, the robot may perform the planned motion. In some embodiments, the robot may control the position of the robot, while the human operator controls the manipulator to perform the task. In some embodiments, tasks may be divided into sub-tasks. At block 504, the industrial task being demonstrated is defined. A task is defined as: starting state, goal state, and constraints. A robot needs to drive the state, including the robot itself and the environment, from the starting state to the goal state, while satisfying the constraints defined in the task. At block 506, the various states of the robot during the demonstration of the task are represented. The states describe the status of the current system, either a geometrical relationship and/or a representational description of objects and robot when a task is executing. Robots may group or ungroup the representation of the states when necessary to facilitate the semantic understanding of the demonstrations. At block 508, the data from the demonstration is saved. The saved data may include, for example, robot configuration, environmental state, robot position and/or movement, manipulator position and/or motion, operator inputs, goals, sequence of events, timing, forces and/or torques applied, etc. For example, the human operator may move the robot base (i.e., the body of the robot) to a position near a component to be moved or actuated. The position may be such that a manipulator has access to the component. The human operator may then use the manipulator (e.g., an arm) to move or actuate the component to perform the task.

At block 510, the demonstration is generalized. For example, the motion plans may be generalized to find the distribution that represents the most plausible and applicable solution. Generalization may include finding the most common constraints of executing a task using a motion plan. At block 512, the system learns how to perform the task. For example, learning the task may include machine learning techniques. Based on the demonstration of the task by the human operator, the system may generate a behavior sequence or adapt an existing behavior sequence to match the demonstration. The learned knowledge is represented in the task space and defined as a finite number of states. For example, behavior sequence generation may include finding a solution to achieve a task goal based on learned knowledge. Given a task, the system finds the subtasks to achieve the task goal based on learned knowledge. The goals of each subtask are then extracted based on the learned knowledge. In some embodiments, the goals may be validated by a human operator as an interim step. At block 514, the system generates a motion plan to perform each subtask. The motion plan may be associated with prior knowledge, but may also be adapted to new task-relevant situations. The candidate motion plan may then be displayed to a user for review. For example, visualizations (e.g., animations, images, video, etc.) of hypothetical execution of the motion plan may be generated and displayed (e.g., via a virtual reality mask, display, television, or projector of the work station) to the user for review. At block 516, the human operator may provide feedback via the controllers or user inputs of the workstation.

If the motion plan is approved by the human operator, the robot may proceed to perform the task. In some embodiments, the sensors on or around the robot may continue to collect data. The collected data may be used to recreate a virtual recreation of the robot and its environment to be displayed to the human operator as the robot performs the task. The human operator may supervise the robot and provide feedback as the robot performs the task (block 520). The system may use the human operator feedback to modify its motion plan. The feedback may also be taken into account as the system re-learns the task taking into account the human operator's feedback. As such, the process 500 may return to block 512. The process 500 may then repeat the task, or move on to a new task.

The presently disclosed techniques include teaching one or more robots to perform an industrial task autonomously or semi-autonomously based on human demonstration of the task. Specifically, one or more sensors disposed on or around the one or more robots may collect data (e.g., video, images, etc.) corresponding to the robots and their surrounding environment. The collected data are then used to generate a virtual recreation of the robots and their surrounding environments, which are displayed to a human operator (e.g., via a virtual reality headset, computer monitor, etc.). The human operator then uses a controller to control the robots within the virtual environment to perform the task. The actual robots may also be controlled by the user based on the user's inputs. The robot then learns how to perform the task based on the human operator's demonstration of the task. The robot may then go on to perform the task autonomously or semi-autonomously. In some embodiments, the sensors may continue to collect data and generate the virtual recreation of the robots and their surrounding environments by which the human operator may supervise the one or more robots as they perform the task autonomously or semiautonomous. The human operator may periodically provide feedback, which may allow the robots to refine their understanding of how to perform the task.

This written description uses examples to disclose the claimed subject matter, including the best mode, and also to enable any person skilled in the art to practice the disclosed subject matter, including making and using any devices or systems and performing any incorporated methods. The patentable scope of the claimed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for performing industrial tasks, comprising:
   a robot, comprising one or more sensors configured to collect data corresponding to the robot and an environment surrounding the robot; and
   a computing device disposed remote from the robot and configured to communicate with the robot via a cloud interface, the computing device comprising:
      a user interface;
      a processor; and
      a memory comprising instructions that, when executed by the processor, cause the processor to:
         receive, via the cloud interface, the collected data from the robot;
         generate a virtual recreation of the robot and the environment surrounding the robot;

receive, via the user interface, inputs from a human operator controlling the robot to demonstrate an industrial task;
wherein the system is configured to:
learn how to perform the industrial task based on the human operator's demonstration of the task; and
perform, via the robot, the industrial task autonomously or semi-autonomously.

2. The system for performing industrial tasks of claim 1, wherein the user interface comprises a virtual reality headset and a controller.

3. The system for performing industrial tasks of claim 1, wherein the user interface comprises a desktop computer, a laptop computer, a tablet, a computer monitor, a television, a projector, or some combination thereof.

4. The system for performing industrial tasks of claim 1, wherein the system is configured to:
generate a motion plan before beginning to perform the industrial task;
present the motion plan to the human operator via the operator interface; and
receive feedback on the motion plan via the operator interface.

5. The system for performing industrial tasks of claim 1, comprising a remote server, wherein the remote server is configured to:
store data corresponding to the robot and the environment surrounding the robot;
learn how to perform the industrial task based on the human operator's demonstration of the task; and
autonomously or semi-autonomously control the robot during performance of the industrial task.

6. The system for performing industrial tasks of claim 1, wherein the robot comprises a task planning component configured to plan the robot's performance of the industrial task.

7. A processor-implemented learning system, comprising:
a processor; and
a memory comprising instructions that, when executed by the processor, cause the processor to:
receive, via a cloud interface, inputs from a human operator controlling a robot as a demonstration of an industrial task, wherein the human operator is disposed remote from the robot;
learn how to control the robot to perform the industrial task based on the demonstration of the industrial task by the human operator; and
control the robot to perform the industrial task autonomously or semi-autonomously.

8. The processor-implemented learning system of claim 7, wherein the instructions cause the processor to:
receive feedback from the human operator during the performance of the task or following performance of the task; and
relearn how to control the robot to perform the industrial task based on the feedback provided by the human operator.

9. The processor-implemented learning system of claim 7, wherein the processor-implemented learning system is disposed within a server remote from the robot, and in communication with the robot.

10. The processor-implemented learning system of claim 7, wherein the processor-implemented learning system is distributed over a plurality of servers in communication with the robot.

11. A method of performing an industrial task, comprising:
receiving inputs from a human operator demonstrating performance of an industrial task by a robot, wherein the robot is disposed remote from the human operator;
learning how to perform the industrial task based on the demonstration of the industrial task;
generating a motion plan for performing the industrial task;
displaying the motion plan to the human operator for approval; and
performing, via the robot, the industrial task upon approval of the motion plan.

12. The method of claim 11, comprising:
collecting data corresponding to the robot and an environment surrounding the robot;
generating a virtual recreation of the robot and the environment surrounding the robot;
displaying the virtual recreation of the robot and the environment surrounding the robot to the human operator.

13. The method of claim 11, wherein learning how to perform the industrial task based on the demonstration of the industrial task comprises generating a definition of the industrial task based on the human operator's demonstration of the industrial task, wherein the definition of the industrial task comprises a starting state, a goal state, one or more intermediate states, and one or more task constraints.

14. The method of claim 11, comprising generalizing the demonstration of the industrial task by the human operator.

15. The method of claim 11, comprising:
receiving feedback from the human operator; and
relearning the industrial task based on the feedback.

16. The system for performing industrial tasks of claim 1, wherein learning how to perform the industrial task based on the human operator's demonstration of the task comprises generating a definition of the industrial task based on the human operator's demonstration of the industrial task.

17. The system for performing industrial tasks of claim 16, wherein the definition of the industrial task comprises a starting state, a goal state, one or more intermediate states, and one or more task constraints.

18. The system for performing industrial tasks of claim 1, wherein the instructions, when executed by the processor, cause the processor to:
present, via the operator interface, the autonomous or semi-autonomous performance of the industrial task to the human operator for the human operator to supervise; and
receive, via the operator interface, feedback from the human operator on the autonomous or semi-autonomous performance of the industrial task.

19. The system for performing industrial tasks of claim 18, wherein the system is configured to relearn how to perform the industrial task based on the feedback from the human operator.

20. The processor-implemented learning system of claim 7, wherein learning how to control the robot to perform the industrial task based on the demonstration of the industrial task by the human operator comprises identifying a starting state, a goal state, one or more intermediate states, and one or more task constraints based on the demonstration of the industrial task.

* * * * *